United States Patent
Koide et al.

(10) Patent No.: US 7,781,933 B2
(45) Date of Patent: Aug. 24, 2010

(54) WINDING ARRANGEMENT FOR ROTATING ELECTRICAL MACHINE

(75) Inventors: Satoshi Koide, Okazaki (JP); Yasuhiko Ishimaru, Toyota (JP); Hiroshi Hattori, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/293,298

(22) PCT Filed: Feb. 22, 2007

(86) PCT No.: PCT/JP2007/053865

§ 371 (c)(1),
(2), (4) Date: Sep. 17, 2008

(87) PCT Pub. No.: WO2007/111073

PCT Pub. Date: Oct. 4, 2007

(65) Prior Publication Data

US 2009/0102308 A1 Apr. 23, 2009

(30) Foreign Application Priority Data

Mar. 29, 2006 (JP) .............................. 2006-090432

(51) Int. Cl.
*H02K 3/46* (2006.01)
*H02K 17/00* (2006.01)
*H02K 27/02* (2006.01)
*H02K 1/00* (2006.01)
*H02K 3/00* (2006.01)

(52) U.S. Cl. ................. 310/195; 310/179; 310/180; 310/182; 310/186; 310/196; 310/207; 310/49.33; 310/49.45; 318/790; 29/596; 29/598

(58) Field of Classification Search ................. 310/195, 310/179, 198, 216, 180, 182, 186, 196, 207, 310/49.33, 49.45; 318/790; 29/596, 598; *H02K 17/00, H02K 27/02, 1/00, 3/00, 3/46*
See application file for complete search history.

(56) References Cited

U.S. PATENT DOCUMENTS

| 4,307,311 | A  | * | 12/1981 | Grozinger | ................... | 310/179 |
| 6,703,751 | B2 | * | 3/2004  | Tanaka et al. | ............... | 310/195 |
| 6,784,584 | B2 | * | 8/2004  | Knoll et al. | ................. | 310/179 |
| 2003/0168921 | A1 | * | 9/2003 | Molina-Martinez | ......... | 310/103 |
| 2005/0242677 | A1 | * | 11/2005 | Akutsu et al. | ............... | 310/179 |

FOREIGN PATENT DOCUMENTS

| JP | 56-129544 A | 10/1981 |
| JP | 2002-199638 A | 7/2002 |
| JP | 2004-159427 A | 6/2004 |

* cited by examiner

*Primary Examiner*—Quyen Leung
*Assistant Examiner*—Michael Andrews
(74) *Attorney, Agent, or Firm*—Kenyon & Kenyon LLP

(57) ABSTRACT

The present invention is intended to provide a winding arrangement of single star connection for a rotating electrical machine, capable of enhancing insulation performance in coils of the same phase. In such winding arrangement, a first coil U1 to a sixth coil U6 are formed respectively in coil arranging parts 1U to 6U. Next, a coil arranging part 7U is skipped and the seventh coil U7 is formed in a coil arranging part 8U. Then, a coil formed at the end of winding (eighth coil U8) is formed in the skipped coil arranging part 7U.

1 Claim, 5 Drawing Sheets

WINDING ARRANGEMENT FOR ROTATING ELECTRICAL MACHINE

This is a 371 national phase application of PCT/JP2007/053865 filed 22 Feb. 2007, claiming priority to Japanese Patent Application No. 2006-090432 filed 29 Mar. 2006, the contents of which are incorporated herein by reference.

TECHNICAL FIELD

The present invention relates to a winding arrangement of single star-connection for a rotating electrical machine.

BACKGROUND ART

Conventionally, many rotating electrical machines have employed a single star connection. In this single star connection, taking for example forming eight U-phase coils, as shown in FIG. 4A, the coils are wound at U-phase coil arranging parts 1U to 8U, starting with a coil U1, winding coils U2 to U7 sequentially, and ending with a coil U8. Due to this arrangement, the coil U1 formed at the start of winding and the coil U8 formed at the end of winding are adjacent to each other. Here, the adjacent coils are wound in different directions. In U-phase coils, as shown in FIG. 4B, the potential difference becomes maximum at a point U and a neutral point. In other words, a maximum potential difference Vmax is caused between the coil U1 and the coil U8. This means that the single star connection brings the coils U1 and U8, wherein the maximum potential difference is caused, into adjacent to each other. Therefore, in rotating electrical machines with windings of the single star connection, insulation may not be ensured in between coils of the same phase when used at high potential.

To avoid this problem, a double star connection is employed instead of the single star connection in rotating electrical machines used at high potential (Japanese Unexamined Patent Application Publication No. 2002-199638). In the double star connection, taking for example forming eight U-phase coils in the same manner as above, a pair of coil groups, respectively consisting of coils U1 to U4 and coils U11 to U14, are arranged in parallel as shown in FIG. 5A. In the coil group of U1 to U4, as in the same manner as in the single star connection, the winding process starts with U1, moves to the coils U2, U3 one after another and ends with the coil U4. The coil group of U11 to U14 are wound in the same manner. Due to this winding manner, the coils U1 and U11 formed at the start of winding are adjacent to each other, and so are the coils U4 and U14 formed at the end of winding. As shown in FIG. 5B, a potential difference becomes maximum between the point U and the neutral point in the U-phase coils. This means that, the maximum potential difference Vmax is caused between the coils U1 and U4 and between the coils U11 and U14. In the double star connection, the coils U1 and U4, and the coils U11 and U14 are respectively located apart so as not to be adjacent to each other. Therefore, in the rotating electrical machines with the double star-connected windings, insulation in coils of the same phase can be secured even when used at high potential.

DISCLOSURE OF INVENTION

Problems to be Solved by the Invention

However, the double star connection mentioned above requires more (double) leads than the single star connection does, so that it takes more parts and steps for handling leads. As a result, manufacturing cost is increased and production efficiency is decreased. Further, the increase in the number of leads will raise the coil end height of the rotating electrical machines (height in an axial direction of the stator), so that miniaturization of the rotating electrical machines could not be achieved.

In contrast, the single star connection requires half the number of leads used in the double star connection, causing no increase in manufacturing cost and no decrease in production efficiency. Further, the coil end height (height in the axial direction of the stator) will not increase, so that miniaturization of the rotating electrical machine can be achieved. However, as described above, when a single star-connected rotating electrical machine is used at high potential, insulation may not be secured in the coils of the same phase.

In this context, there has been a need for enhancing an insulation property in the coils of the same phase in the rotating electrical machine with single star-connected windings.

The present invention has been made in order to solve the aforementioned problems and has a purpose to provide a winding arrangement for a rotating electrical machine with single star connected windings, capable of enhancing an insulation property in coils of the same phase.

Means for Solving the Problems

In order to achieve the above object, there is provided a winding arrangement of a single star connection for a rotating electrical machine, wherein a plurality of coils are formed in such a manner that the coils including a first coil formed at a start of winding and a last coil formed at an end of winding are arranged in a plurality of coil arranging parts individually, at least one coil arranging part being skipped, and one of the first coil and the last coil is arranged in the skipped coil arranging part.

In the winding arrangement, coils are formed in such a manner that, a plurality of coils are formed in such a manner that the coils including a first coil formed at a start of winding and a last coil formed at an end of winding are arranged in a plurality of coil arranging parts individually, at least one coil arranging part being skipped, and one of the first coil and the last coil is arranged in the skipped coil arranging part. Accordingly, the first coil and the last coil are located apart so as not to be adjacent to each other. Therefore, the maximum potential difference between adjacent coils can be minimized, thereby providing a high insulation performance in the coils of the same phase.

In the winding arrangement of the present invention, preferably, the plurality of coil arranging parts are located circumferentially; the first to $n^{th}$ coils are sequentially formed in the coil arranging parts located adjacently to a predetermined coil arranging part; a $n+1^{th}$ coil is formed in a coil arranging part adjacent to the first coil by skipping a coil arranging part adjacent to the predetermined coil arranging part; and a coil following the $n+1^{th}$ coil is formed in a coil arranging part adjacent to the $n+1^{th}$ coil and opposite the first coil, so that the last coil is arranged in a coil arranging part adjacent to the predetermined coil arranging part.

Accordingly, a coil formed one earlier than the last coil, which precedes the last coil, can be assuredly located between the first coil and the last coil. Thus, the maximum potential difference between the adjacent coils can be lowered, thereby providing a high insulation performance in the coils of the same phase.

In the winding arrangement of the present invention, preferably, a coil formed two earlier than the last coil is located in the predetermined coil arranging part.

Accordingly, the last coil is located between the two successive coils, so that the first coil and the last coil can be located apart so as not to be adjacent to each other. Therefore, the maximum potential difference between the adjacent coils can be lowered, thereby providing a high insulation performance in the coils of the same phase.

In the winding arrangement of the present invention, preferably, a coil formed three earlier than the last coil is located in the predetermined coil arranging part.

Accordingly, winding directions of the wire for forming the coils can be by turns reversed as in the conventional single star connection, so that the conventional equipment can be also used by merely changing the sequence of forming the coil. Therefore, with minimum necessary reequipping, the maximum potential difference can be lowered between the adjacent coils, thereby providing a high insulation performance in the coils of the same phase.

In the winding arrangement of the present invention, preferably, the plurality of coil arranging parts are located circumferentially; the first to $n^{th}$ coils are sequentially formed in the coil arranging parts located adjacently to a first predetermined coil arranging part; a $n+1^{th}$ coil is formed in a coil arranging part adjacent to the first coil by skipping back one or more of the $n-1^{th}$ coil and coils following the $n+1^{th}$ coil are sequentially formed in the coil arranging parts located adjacently to a second predetermined coil arranging part; a subsequent coil to the coils following the $n+1^{th}$ coil is formed in a coil arranging part adjacent to the first predetermined coil arranging part by skipping a coil arranging part adjacent to the second predetermined coil arranging part, and a further subsequent coils to the coils following the $n+1^{th}$ coil are sequentially formed in the coil arranging parts located adjacently opposite the first predetermined coil arranging part, so that the last coil is formed at the coil arranging part adjacent to the second predetermined coil arranging part.

Accordingly, the coils preceding the last coil are located at adjacent both sides of the last coil. At the same time, the coils adjacent to the last coil can be kept apart from the first coil, that is, the first coil and the last coil can be kept apart further. Therefore, the maximum potential difference in the adjacent coils can be still lowered, thereby providing a higher insulation performance in the coils of the same phase more.

EFFECT OF THE INVENTION

The winding arrangement for the rotating machine according to the present invention allows to maintain the single star connection as well as to keep the first coil and the last coil apart so as not to be adjacent to each other. Therefore, the maximum potential difference between the adjacent coils can be lowered, thereby providing a high insulation performance in the coils of the same phase.

BEST MODE FOR CARRYING OUT THE INVENTION

A detailed description of preferred embodiments of a winding arrangement for a rotating electrical machine according to the present invention will now be given with reference to the accompanying drawings. The description of the embodiments explains application of the present invention to manufacturing a stator for use in a three-phase brushless DC motor. Coils for each phase are mounted to a known stator core (not shown) which is of a ringed-shape as seen from the top, and formed with a plurality of teeth extending radially inward and slots arranged therebetween. The following description explains as an example attaching eight coils for each phase to a stator core provided with forty eight teeth and slots.

First Embodiment

Figure 1:
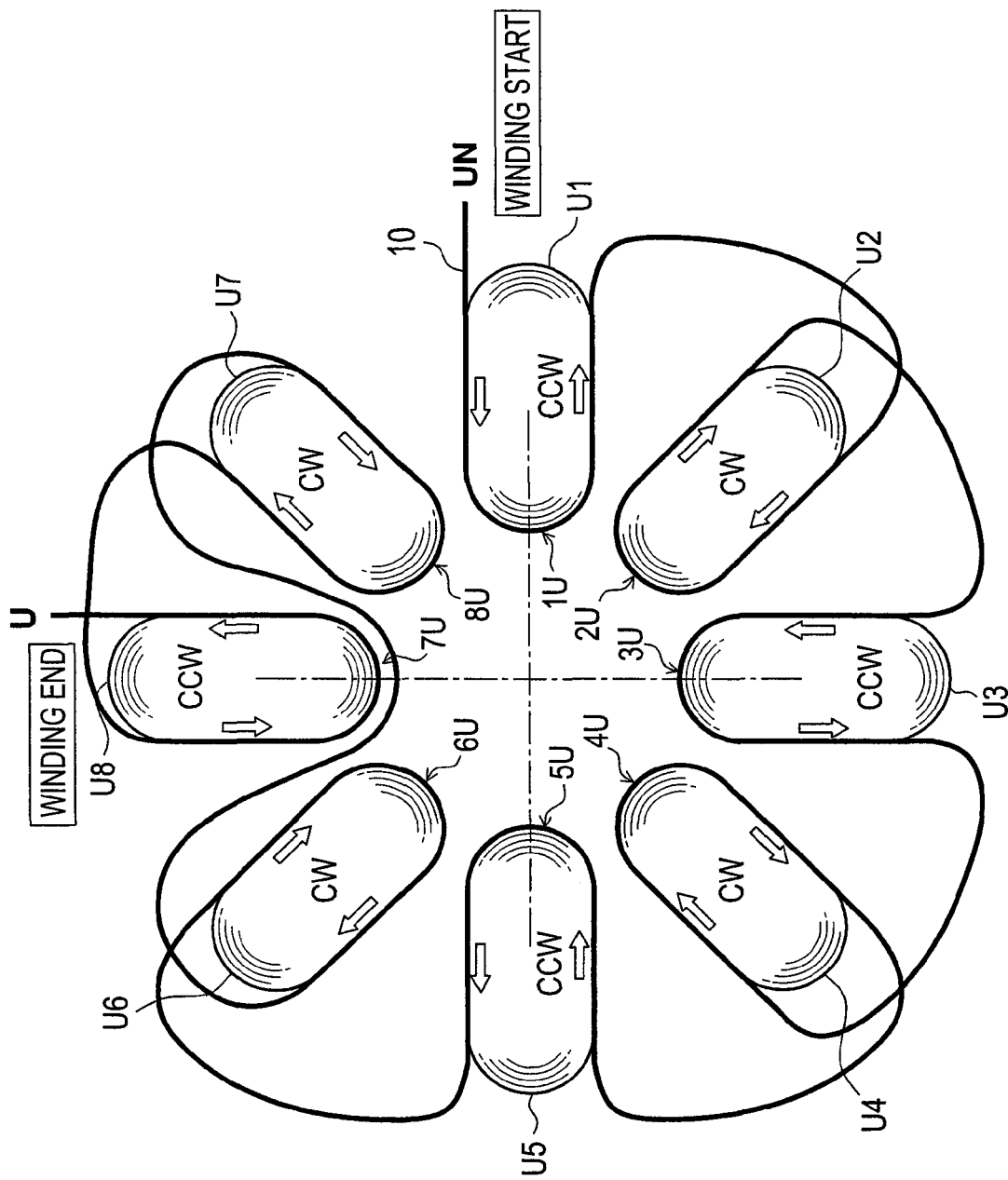
FIG. 1 is a schematic view showing a winding arrangement of a first embodiment.

A first embodiment will be explained. FIG. 1 is a schematic view showing a winding arrangement of the first embodiment. FIG. 1 depicts a winding arrangement for U-phase coils only. This is because V-phase coils and W-phase coils are wound in the same manner as the U-phase coils, except for positions where the coils are arranged. So, an explanation is given as to how the U-phase coils are arranged only, and winding arrangements of the V-phase coil and the W-phase coil are not explained below.

In the winding arrangement of the first embodiment, as shown in FIG. 1, a coil group is formed by sequentially forming the first coil U1 to the eighth coil U8 respectively in coil arranging parts (positions) 1U to 8U located circumferentially. In the arrangement, a start point of winding a wire 10 is designated as a neutral line UN and a winding end of the eighth coil U8 is designated as a power line U. Here, the coil arranging parts 1U to 8U are defined by allocating the coil arranging part 1U to the part for a coil formed at the winding start (first coil) U1 and sequentially numbering the remaining parts in a clockwise direction.

According to the winding arrangement of the first embodiment, when forming the seventh coil U7 following the sixth coil U6, the wire 10 is moved to the coil arranging part 8U to form the seventh coil U7 therein, skipping the coil arranging part 7U. This brings the eighth coil U8 between the sixth coil U6 and the seventh coil U7. Owing to this arrangement, the first coil U1 formed at the start of winding and the eighth coil U8 formed at the end of winding (last coil) are unadjacent to each other.

Figures 4A, 4B:
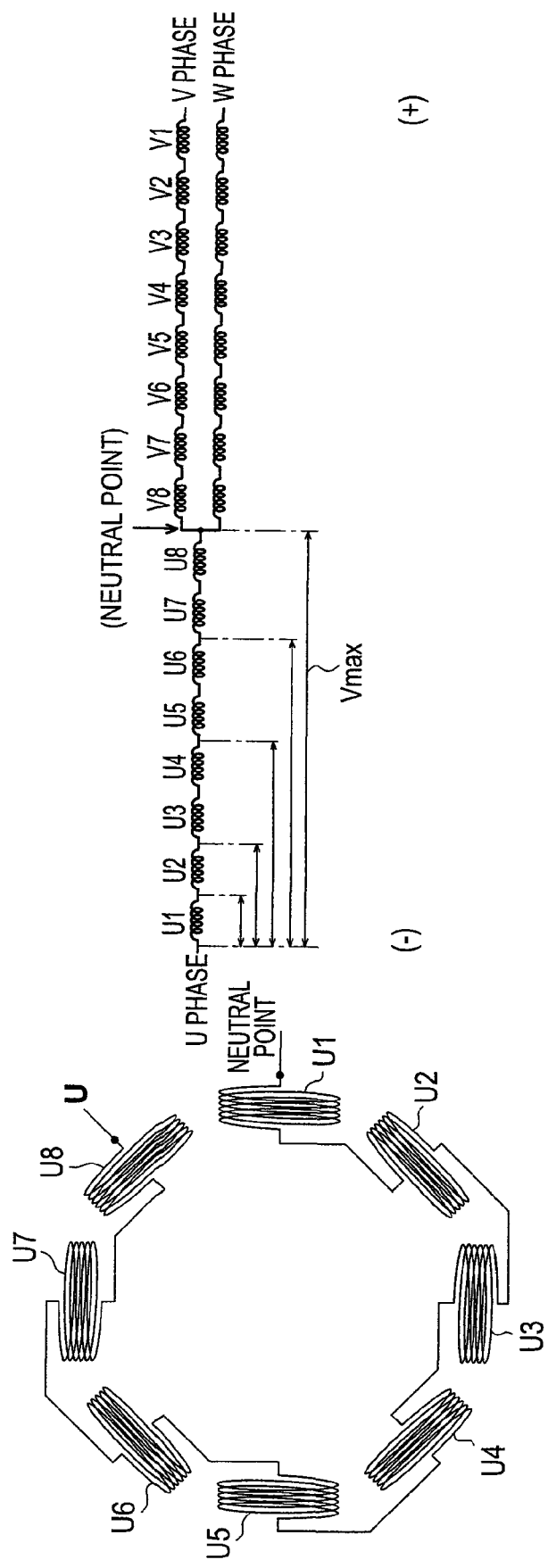
FIG. 4A is a schematic view showing a single star-connected winding arrangement of the prior art.
FIG. 4B is a connection diagram of the single star-connected winding arrangement of the prior art.
Figure 5B:
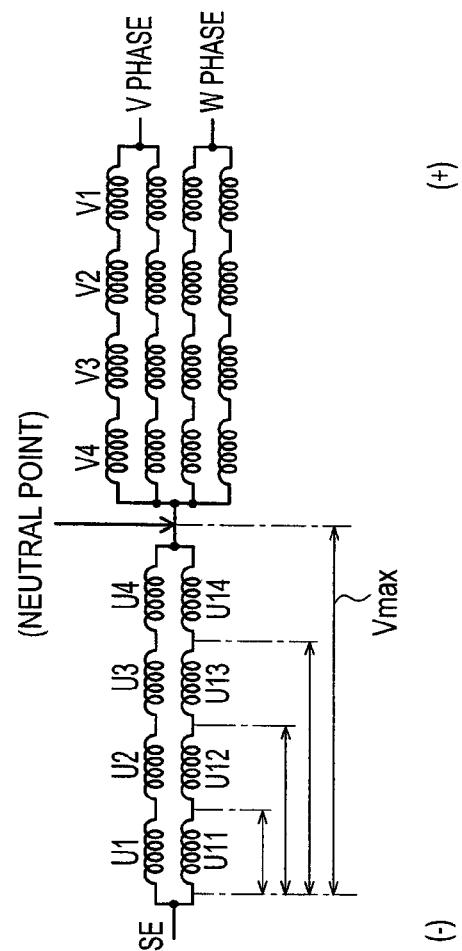
FIG. 5B is a connection diagram of the double star-connected winding arrangement of the prior art.
Figure 5A:
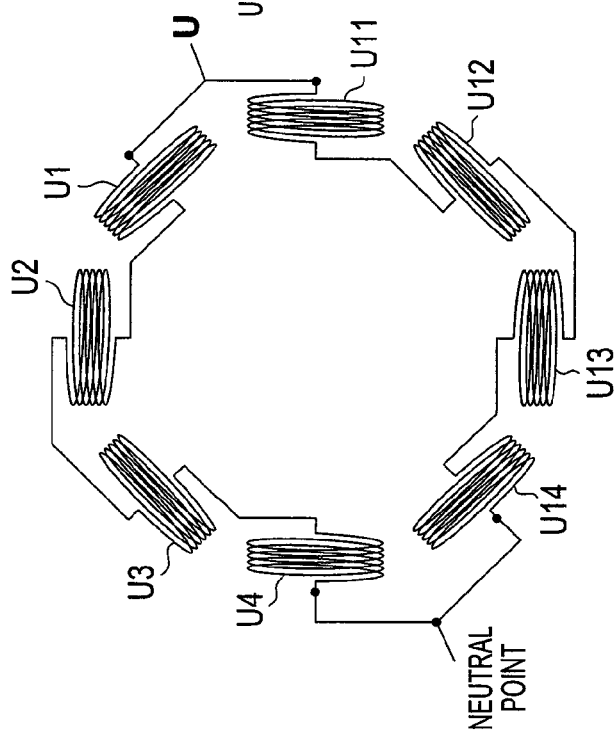
FIG. 5A is a schematic view showing a double star-connected winding arrangement of the prior art.

In winding the coils in such an arrangement, the wire 10 is wound around a tooth in a counterclockwise (CCW) direction between the slots corresponding to the U-phase coil arranging part 1U so as to form the first coil 1U. Next, the wire 10 is wound around another tooth in a clockwise (CW) direction in the U-phase coil arranging part 2U so as to form the second coil 2U. Then, in a similar manner, the third to sixth coils U3, U4, U5 and U6 are formed respectively in the U-phase coil arranging parts 3U, 4U, 5U and 6U, by winding the wire 10 with its winding directions reversed by turns. More specifically, the third coil U3 and the fifth coil U5 are formed by winding the wire 10 in the counterclockwise direction, and the fourth coil U4 and the sixth coil U6 are formed by winding the wire 10 in the clockwise direction. Stated differently, the first coil U1 to the sixth coil U6 are wound in the same manner as the conventional winding arrangement of the single star connection (see FIG. 4A).

Subsequently, in forming the seventh coil U7, the U-phase coil arranging part 7U is skipped and the seventh coil U7 is formed in the U-phase coil arranging part 8U. In this step, the seventh coil U7 is formed by winding the wire 10 in the clockwise direction. Finally, the eighth coil U8 is formed by winding the wire 10 in the counterclockwise direction in the U-phase coil arranging part 7U skipped in the prior step.

By forming the first coil U1 to the eighth coil U8 in the above manner, the seventh coil U7 is located between the first coil U1 formed at the winding start and the eighth coil U8 formed at the winding end. Due to this arrangement, the first coil U1 and the eighth coil U8 are set apart so as not to be adjacent to each other.

Incidentally, according to the measurement of the potential difference between the adjacent coils in a stator employing the above winding arrangement, the maximum potential difference was observed between the first coil U1 and the seventh coil U7. However, the potential difference was lower by approximately 17% than the maximum potential in the conventional winding arrangement of the single star connection.

As described above precisely, according to the winding arrangement of the first embodiment, since the eighth coil U8 is located between the sixth coil U6 and the seventh coil U7 while maintaining the single star connection, the maximum potential difference in the coils of the same phase can be made less. Accordingly, a high insulation performance can be provided in the coils of the same phase. In addition, since the winding arrangement of the first embodiment maintains the single star connection, the number of leads will not increase as in the double star connection. Therefore, since parts or steps for handling leads will not increase, cost increase and reduction of production efficiency can be avoided. Further, miniaturization of motors will not be impeded because the coil end height of the stator is not raised.

Second Embodiment

Figure 2:
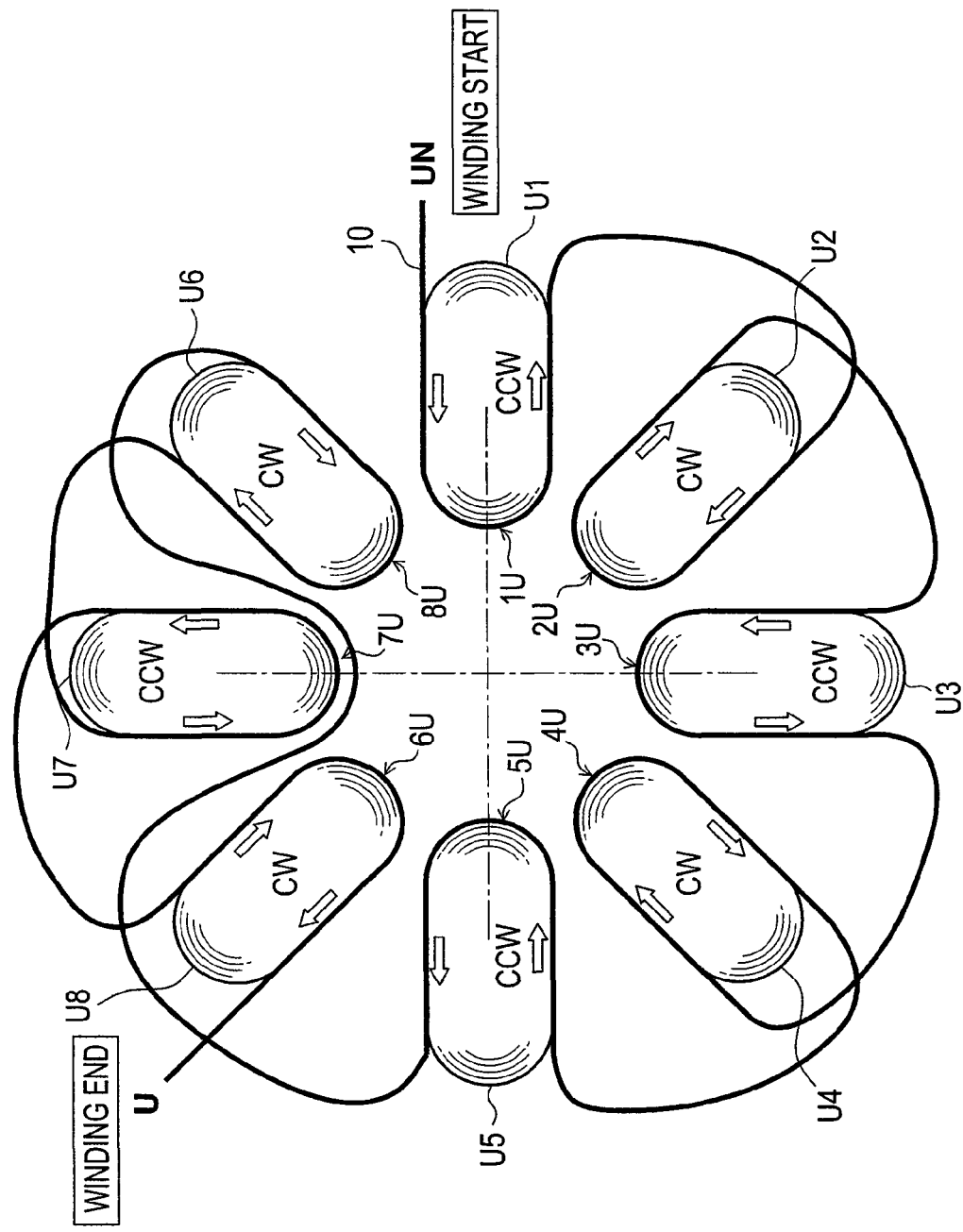
FIG. 2 is a schematic view showing a winding arrangement of a second embodiment.

A second embodiment will be explained with reference to FIG. 2. FIG. 2 is a schematic view showing a winding arrangement of the second embodiment. As in the first embodiment, a winding arrangement is illustrated for the U-phase coils only, in FIG. 2.

In the winding arrangement of the second embodiment, as shown in FIG. 2, a coil group is formed by sequentially forming the first coil U1 to the eighth coil U8 respectively in coil arranging parts 1U to 8U located circumferentially. In the arrangement, a starting point of winding a wire 10 is designated as a neutral line UN and a winding end of the eighth coil U8 is designated as a power line U. In forming the sixth coil U6 following the fifth coil U5, the wire 10 is moved to the coil arranging part 8U to form the sixth coil U6 therein, skipping two of the coil arranging parts 6U and 7U. This brings the eighth coil U8 between the fifth coil U5 and the seventh coil U7. Owing to this arrangement, the first coil U1 formed at the winding start and the eighth coil U8 formed at the winding end are unadjacent to each other.

In winding the coils in such an arrangement, the wire 10 is wound around a tooth in a counterclockwise (CCW) direction between the slots corresponding to the U-phase coil arranging part 1U so as to form the first coil U1. Next, the wire 10 is wound on another tooth in a clockwise (CW) direction in the U-phase coil arranging part 2U so as to form the second coil U2. Then, in a similar manner, the third to fifth coils U3, U4, and U5 are formed respectively in the U-phase coil arranging parts 3U, 4U and 5U, by winding the wire 10 with its winding directions reversed by turns. More specifically, the third coil U3 and the fifth coil U5 are formed by winding the wire 10 in the counterclockwise direction, and the fourth coil U4 is formed by winding the wire 10 in the clockwise direction. Stated differently, the first coil U1 to the fifth coil U5 are wound in the same manner as the conventional winding arrangement of the single star connection (see FIG. 4A).

Subsequently, in forming the sixth coil U6, the U-phase coil arranging parts 6U and 7U are skipped and the sixth coil U6 is formed in the U-phase coil arranging part 8U. In this step, the sixth coil U6 is formed by winding the wire 10 in the clockwise direction. Then, the seventh coil U7 and the eighth coil U8 are formed respectively in the U-phase coil arranging parts 7U and 6U skipped in the prior step. In particular, the wire 10 is wound in the counterclockwise direction around the U-phase coil arranging part 7U so as to form the seventh coil U7, and the wire 10 is wound in the clockwise direction around the U-phase coil arranging part 8U so as to form the eighth coil U8. In this winding arrangement, winding directions of the wire 10 in the first coil U1 to the eighth coil U8 are by turns reversed in the same manner as in the conventional single star connection.

By forming the first coil U1 to the eighth coil U8 in the above manner, the sixth coil U6 and the seventh coil U7 are located between the first coil U1 formed at the winding start and the eighth coil U8 formed at the winding end. Due to this arrangement, the first coil U1 and the eighth coil U8 can be set apart so as not be adjacent to each other.

Incidentally, according to the measurement of the potential difference between the adjacent coils in a stator employing the above winding arrangement, the maximum potential difference was observed between the fifth coil U5 and the eighth coil U8. However, the potential difference was lower by approximately 21% than the maximum potential in the conventional winding arrangement of the single star connection.

As described above precisely, according to the winding arrangement of the second embodiment, while maintaining the single star connection, the eighth coil U8 is located between the fifth coil U5 and the seventh coil U7, and at the same time the sixth coil U6 and the seventh coil U7 are located between the first coil U1 and the eighth coil U8. Thus the maximum potential difference in the coils of the same phase can be made less. Accordingly, a high insulation performance in the coils of the same phase can be provided. In addition, since the winding arrangement of the second embodiment maintains the single star connection, the number of leads will not increase as in double star connection. Therefore, since parts or steps for handling leads will not increase, cost increase and reduction of production efficiency can be avoided. Further, miniaturization of motors will not be impeded because the coil end height of the stator will not be raised. Also, according to the winding arrangement of the second embodiment, reequipping can be minimized because the winding directions of the wire 10 in the first coil U1 to the eighth coil U8 can be kept as the same as in the conventional single star connection.

Third Embodiment

Figure 3:
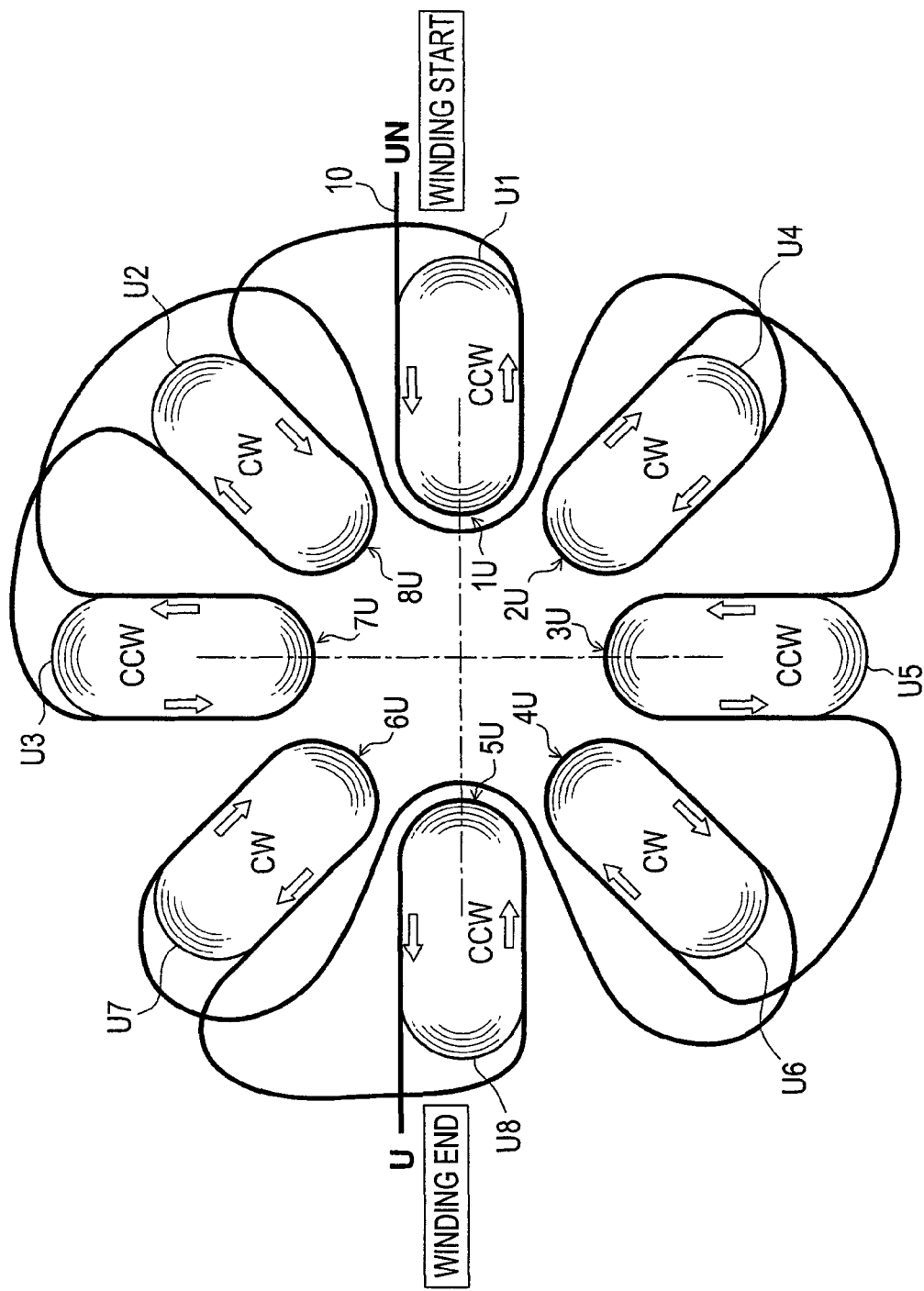
FIG. 3 is a schematic view showing a winding arrangement of a third embodiment.

Finally, a third embodiment will be explained with reference to FIG. 3. FIG. 3 is a schematic view-showing a winding arrangement of the third embodiment. As in the first embodiment, FIG. 3 depicts a winding arrangement for the U-phase coils only.

In the winding arrangement of the third embodiment, as shown in FIG. 3, a coil group is formed by sequentially forming the first coil U1 to the eighth coil U8 respectively in coil arranging parts 1U to 8U located circumferentially. In the arrangement, a start point of winding a wire 10 is designated as a neutral line UN and a winding end of the eighth coil U8 is designated as a power line U. In forming the fourth coil U4 following the third coil U3, the wire 10 is moved to the U-phase coil arranging part 2U to form the fourth coil U4 therein, skipping two of the coil arranging parts 8U and 1U, respective for the coils U2 and U1. Further, in forming the seventh coil U7 following the sixth coil U6, the wire 10 is moved to the U-phase coil arranging part 6U to form the seventh coil U7 therein, skipping the U-phase coil arranging part 5U. In this manner, the first coil U1 is located between the second coil U2 and the fourth coil U4, and at the same time the eighth coil U8 is located between the sixth coil U6 and the seventh coil U7. Due to this arrangement, the first coil U1 formed at the winding start and the eighth coil U8 formed at the winding end are set apart so as not to be adjacent to each other.

In winding the coils in the above arrangement, the wire 10 is wound around a tooth in a counterclockwise (CCW) direction between the slots corresponding to the U-phase coil arranging part 1U so as to form the first coil U1. Next, the wire 10 is wound on another tooth in a clockwise (CW) direction in the U-phase coil arranging part 2U so as to form the second coil U2. Next, the wire 10 is wound on another tooth in the counterclockwise direction in the U-phase coil arranging part 7U so as to form the third coil U3. Then, in winding the fourth coil U4, the U-phase coil arranging parts 8U and 1U are skipped and the fourth coil U4 is formed in the U-phase coil arranging part 2U. In this step, the fourth coil U4 is formed by winding the wire 10 in the clockwise direction. Subsequently, the fifth coil U5 and the sixth coil U6 are formed respectively in the U-phase coil arranging parts 3U and 4U, by winding the wire 10 with its winding directions reversed in turn. To be more precise, the fifth coil U5 is formed by winding the wire 10 in the counterclockwise direction and the sixth coil U6 is formed by winding the wire 10 in the clockwise direction.

Next, the seventh coil U7 is formed in the U-phase coil arranging part 6U, skipping the U-phase coil arranging part 5U. In this step, the seventh coil U7 is formed by winding the wire 10 in the clockwise direction. Finally, the eighth coil U8 is formed in the U-phase coil arranging part 5U skipped in the prior step. The eighth coil is formed by winding the wire 10 in the clockwise direction. In other words, the manner of forming the sixth to eighth coil U6 to U8 is the same as that of the first embodiment except for positions of the coils.

By forming the first coil U1 to the eighth coil U8 in the above manner, the seventh coil U7, the third coil U3 and the second coil U2 are located between the first coil U1 formed at the winding start and the eighth coil U8 formed at the winding end. Due to this arrangement, the first coil U1 and the eighth coil U8 are set apart so as not to be adjacent to each other.

Incidentally, according to the measurement of the potential difference between the adjacent coils in a stator employing this winding arrangement, the maximum potential difference was observed between the third coil U3 and the seventh coil U7. However, the potential difference was lower by approximately 43% than the maximum potential in the conventional winding arrangement of the single star connection.

As described above precisely, according to the winding arrangement of the third embodiment, while maintaining the single star connection, the first coil U1 is located between the second coil U2 and the fourth coil U4, and at the same time the eighth coil U8 is located between the sixth coil U6 and the seventh coil U7. In this arrangement, the seventh coil U7, the third coil U3 and the second coil U2 are located between the first coil U1 and the eighth coil U8. Thus, the maximum potential difference further in the coils of the same phase can be made less. Accordingly, a higher insulation performance can be provided in the coils of the same phase. In addition, since the winding arrangement of the third embodiment maintains the single star connection, the number of leads will not increase as in the double star connection. Therefore, since parts or steps for handling leads will not increase, cost increase and reduction of production efficiency can be avoided. Further, miniaturization of motors will not be impeded because the coil end height of the stator is not be raised.

These embodiments are shown merely as examples and they no way restrict the present invention. Accordingly, the present invention can be naturally improved and modified variously without departing from a scope of the invention. For example, in the above embodiments, the coil group may be formed by winding the wire 10, starting with the first coil U1, winding eight coils sequentially, and ending with the eighth coil U8(U1->U2->U3->U4->U5->U6->U7->U8). However, it is possible to form the coils in the reverse manner, that is, by starting with the eighth coil U8, winding the coils sequentially from the eighth coil U8, and ending with the first coil U1(U8->U7->U6->U5->U4->U3->U2->U1).

While the present invention has been described in the above embodiments taking a motor with distributed windings as an example, it is possible to apply the present invention to a motor with concentrated windings.

The invention claimed is:

1. A winding arrangement of a single star connection for a rotating electrical machine, wherein a plurality of coils for one phase are connected in series, the plurality of coils are formed in such a manner that the coils including a first coil formed at a start of winding and a last coil formed at an end of winding are arranged in a plurality of coil arranging parts individually, at least one coil arranging part being skipped, and one of the first coil and the last coil is arranged in the skipped coil arranging part, the plurality of coil arranging parts are located circumferentially;

the first to $n^{th}$ coils are sequentially formed in adjacent coil arranging parts in a first circumferential direction from a first coil arranging part to a first predetermined coil arranging part;

a $n+1^{th}$ coil is formed in a coil arranging part adjacent to the first coil by skipping the $n^{th}$ to first coils in a second circumferential direction opposite to the first circumferential direction, coils following the $n+1^{th}$ coil are sequentially formed in the coil arranging parts to a second predetermined coil arranging part in the second circumferential direction; and a subsequent coil to the coils following the $n+1^{th}$ coil is formed in a coil arranging part adjacent to the first predetermined coil arranging part by skipping, in the second circumferential direction, a coil arranging part adjacent to the second predetermined coil arranging part, so that the last coil is formed at the coil arranging part adjacent to the second predetermined coil arranging part.

* * * * *